United States Patent [19]

Dummersdorf et al.

[11] Patent Number: 5,369,947
[45] Date of Patent: Dec. 6, 1994

[54] PROCESS FOR CONVERTING PLASTIC WASTE INTO POWER

[75] Inventors: Hans-Ulrich Dummersdorf; Helmut Waldmann, both of Leverkusen, Germany

[73] Assignee: Bayer Aktiengesellschaft, Leverkusen, Germany

[21] Appl. No.: 120,630

[22] Filed: Sep. 13, 1993

[30] Foreign Application Priority Data

Sep. 23, 1992 [DE] Germany ............... 4231771

[51] Int. Cl.$^5$ ............... F02C 3/26
[52] U.S. Cl. ............... 60/39.02; 60/39.461; 60/39.15
[58] Field of Search ............ 60/39.461, 39.182, 39.15, 60/39.12, 39.5, 39.02

[56] References Cited

U.S. PATENT DOCUMENTS

| | | | |
|---|---|---|---|
| 3,589,313 | 6/1971 | Smith et al. | 110/8 |
| 4,212,160 | 7/1980 | Blaskowski | 60/39.12 |
| 4,505,795 | 3/1985 | Alamaro | 60/39.12 |
| 5,055,167 | 10/1991 | Dummersdorf | 204/165 |

*Primary Examiner*—Richard A. Bertsch
*Assistant Examiner*—William Wicker
*Attorney, Agent, or Firm*—Sprung Horn Kramer & Woods

[57] ABSTRACT

The plastic waste is reacted in a plasma reactor 3 under reducing conditions in a plasma containing substoichiometric oxygen at temperatures above 1200° C. to form a plasma pyrolysis gas consisting of low molecular weight carbon fragments which is then cooled to temperatures below 1500° C. The cooled plasma pyrolysis gas is then delivered in compressed form as a fuel of high calorific value and high temperature to a gas turbine 10 for generating power. The waste heat of this gas turbine is used to generate steam which is fed into a steam turbine 12 for generating more power. The process is suitable for plastic waste of any composition and leads to complete conversion into a gas of high calorific value so that a high exergetic efficiency level is achieved.

5 Claims, 1 Drawing Sheet

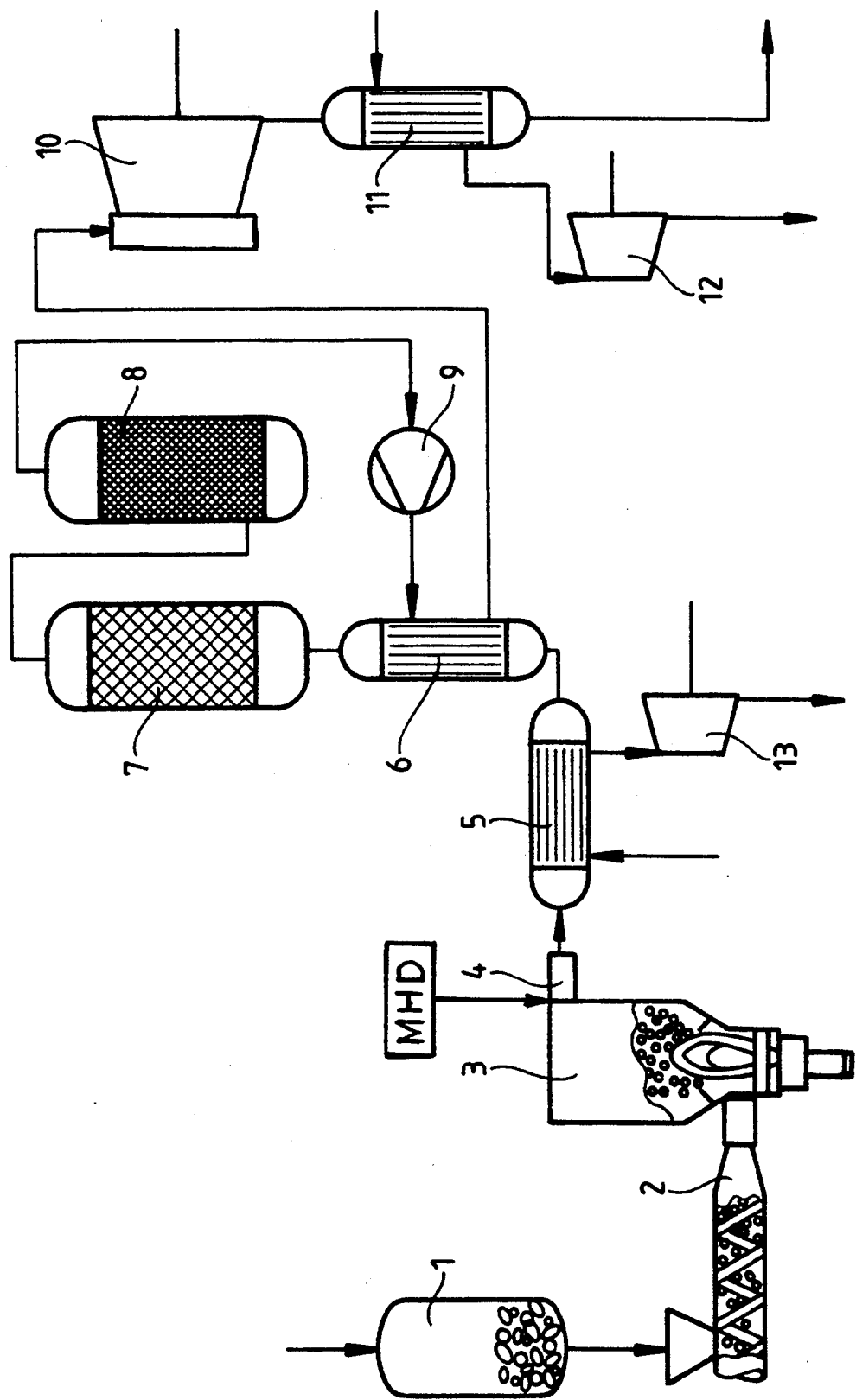

PROCESS FOR CONVERTING PLASTIC WASTE INTO POWER

BACKGROUND OF THE INVENTION

The utilization of plastic waste is of considerable social significance. The present invention relates to a process for the maximal conversion of plastic waste into power and, hence, for the complete and ecologically safe disposal of unsorted, unpurified mixed plastic waste. The problem addressed by the invention was to eliminate the need for disposal at waste disposal sites, which is only possible to a limited extent, or for incineration and to enable mixed plastic waste of any origin, i.e. in the state in which it accumulates on collection, to be additionally utilized to the maximum extent in such a way that primary energy sources (such as gas, oil and coal) could be saved so that recycling, i.e. making hydrocarbons available, would be possible.

There are many known processes for recycling polymers and polymer degradation products which have to take the material composition of the waste plastic into consideration to varying degrees. Material utilization is only possible to a limited extent. The recycling processes are divided into physical/thermal, chemical/thermal and chemical processes.

The physical/thermal processes comprise melting and re-forming of the plastic waste. DE-PS 36 03 009 describes one such process. These processes generally involve the following disadvantages:

The polymer waste has to be purified and sorted; however, this is never the case in practice.

Polymers age to a more or less considerable extent, so that their quality properties deteriorate appreciably after such recycling processes so that they can no longer be used for many applications.

Polymers are only able to withstand a limited number of cycles in physical/thermal recycling processes, i.e. final disposal is still necessary.

At the present time, disposal at waste disposal sites is still the most common form of final disposal although in the future incineration is likely to be preferred.

The incineration of plastics as an often preferred end solution has the following disadvantages:

Due to the presence of chlorine (PVC), dioxins are always likely to be formed during the incineration process. At the same time, $NO_x$ is formed where incineration is carried out at high flame temperatures; the subsequent purification of waste gases is extremely expensive;

Except for low-level steam generation, the plastic waste is not utilized, but merely disposed of.

Further possibilities for the disposal of plastic waste lie in fluidized bed gasification. Although this variant would enable the plastic waste to be utilized as energy, it would entail the following disadvantages:

Due to the high degree of crosslinking of polymers, the chemical reactivity of the plastics during gasification under conventional process conditions is poor;

The heat transport processes in the particles are a problem at the temperatures applied;

Melting of the thermoplastics introduced into the gasification reactor leads to possible disturbances in the fluidized bed;

The plastics are merely converted into lean gas of low calorific value during the gasification process;

Through the use of oxygen, there is always a risk of dangerous organic chlorine compounds being formed.

Substantially the same arguments may be applied to more recent gasification processes introduced into the debate (Bandermann, K., "Abfälle im Sauerstoffstrom", VDI-Nachrichten 6, Feb. 7, 1992, page 28; Menges G. and Fischer R., "Kohlenstoffrecycling beim Aufarbeiten gemischter Kunststoffabfälle (Recycling of Carbon in the Working up of Mixed Plastic Waste)", Kunststoffe 81 (1991)).

In addition to the gasification of plastics, there are a number of pyrolysis processes (see, for example, DE 33 23 161 and DE 35 31 514) which operate at low to medium temperatures (400° to 900° C.). These processes provide gaseous pyrolysis products and oils from the pyrolysis stage which are generally incinerated in a second high-temperature incineration stage. The gases and oils can be utilized to a limited extent for their energy content. However, chlorinated hydrocarbons (including above all chlorinated aromatic hydrocarbons) are formed to a large extent in the pyrolysis stage and represent a potential risk through the formation of dioxins and furans in the subsequent incineration process.

One feature common to all the various processes mentioned is that the plastics disposed of can only be utilized inefficiently, if at all, as an energy source although their energy content is considerably higher than that of lignite or mineral coal. Partial material utilization is only possible in exceptional cases. The products formed in conventional processes are generally difficult to market, although there is an almost unlimited market for power.

SUMMARY OF THE INVENTION

Accordingly, the problem addressed by the present invention was to provide a process by which the high energy content of mixed plastic waste of any composition could be efficiently converted into power in the form of electricity and which, at the same time, would enable the plastic waste to be disposed of completely and safely without any formation of pollutants. At the same time, a high percentage of fossil raw materials would be specifically saved to preserve raw material resources and the environment.

According to the invention, the problem stated above has been solved by coupling a plasma pyrolysis process with a combined gas/steam turbine process, so that both processes together in their coupled form represent a highly effective "plastic-driven power generator".

The object of the plasma pyrolysis process, which is carried out under reducing conditions at temperatures above 1200° C., is to raise the high energy content (calorific value) of the plastic waste, which is (or can be utilized) at an extremely low exergetic level, by coupling in an energy form of high exergy (electricity) by a quasi-heat transformation process to a relatively high exergetic level at which the entire high calorific value of the plastic waste can be utilized very efficiently (at a high exergetic level) by conversion into power by the gas and steam turbine process coupled in accordance with the invention. At the same time, the time-coherent and complete conversion of any polymer components is achieved in very short reaction times by virtue of the high reactivity of the plasma.

In one preferred embodiment, the process according to the invention comprises the following stages for practical application:

Pyrolysis (or gasification) of the plastic waste in a plasma reactor under reducing conditions at temperatures above 1200° C. in the presence of substoichiometric oxygen:

Cooling of the plasma by quenching and indirect heat transfer to produce steam;

Cooling and purification of the plasma pyrolysis gas to remove heavy metals and traces of acids (for example $H_2S$, HCl, HF and HCN);

Compression of the plasma pyrolysis gas to a pressure of >10 bar;

Heating of the plasma pyrolysis gas to a temperature near the temperature of the plasma pyrolysis gas before its purification;

Combustion of the reheated plasma pyrolysis gas in the gas turbine to produce electricity with high exergetic efficiency;

Passing the waste gases from the gas turbine into a boiler to generate steam;

Using the exergetic steam potential in a following steam turbine to generate electricity.

In the context of the present invention, carrying out the plasma pyrolysis of the plastic waste under substoichiometric conditions is intended to be defined in such a way that a $C/O_2$ ratio of <1 is always present throughout the system. In practice, this can be done by monitoring the $CO_2$ concentration of the plasma pyrolysis gas (including regulating the supply of oxygen to the plasma reactor).

In one advantageous modification of the process according to the invention, an MHD generator is installed between the plasma reactor and the quenching stage, the electricity yield and hence utilization of the exergy content of the plasma being significantly increased. The partly ionized plasma pyrolysis gas is at a very high exergetic level immediately behind the plasma reactor, i.e. reaches temperatures of up to 3500° C. which produces a high Carnot factor. The prior art in the development of MHD generators, which all produce the plasma under oxidative conditions (combustion of a fuel gas with oxygen), can be found in Chapman, Johanson, "MHD Generators in Power Production", Mechanical Engineering, 9/91, pages 64 to 68. The advantage of the variant according to the invention is that the ionized plasma enters the MHD generator at considerably higher temperatures than in conventional combustion processes. The power yield is thus increased. The second advantage is that the plasma pyrolysis gas does not have to be burnt for use in the MHD generator, instead the enthalpy of combustion can still be utilized for the following gas turbine so that overall conversion efficiencies of up to 0.7 or 0.8 appear possible. It is advisable to use graphite for lining any equipment exposed to such severe thermal and chemical stressing.

The purified plasma pyrolysis gases may also be directly utilized in part in another (chemical) process.

In another advantageous variant of the process according to the invention, the heated and partly plasticized polymer mixture containing thermally inert inclusions is fed and introduced into the plasma pyrolysis reactor by extrusion. In this way, the mixed polymer waste is preheated and, at the same time, chemically and physically predigested and can be uniformly dispensed without any problems despite its possibly difficult physical consistency.

The process according to the invention has the following fundamental advantages:

1. Complete conversion of the plastic waste or any organic material into a gas of high calorific value by high non-specific reactivity in the reaction in the plasma stage.

2. Utilization of the thermal enthalpy of the plasma pyrolysis gas leaving the plasma stage at a high exergetic level (high pressure steam generation).

3. The use of the gas of high calorific value in the gas turbine allows high exergetic efficiency levels.

4. The high energy content of the plastic waste used may be additionally converted into power with a high degree of efficiency.

5. PVC can also be converted into power and disposed of by the process according to the invention.

6. The plastic waste can be safely disposed of; there is no danger of dioxin, furan or nitrogen oxide formation at any stage of the process.

7. A large proportion of the electricity used in the plasma stage can also be recovered as power. The power derived from the process considerably exceeds the electricity used in the plasma pyrolysis stage.

8. The process provides for the far more economic disposal of plastic waste than known processes.

9. Overly proportional saving of fossil fuels (oil, coal, gas) for power generation in relation to conventional condensation-driven power generation processes, so that the resources thus saved can be materialized.

BRIEF DESCRIPTION OF THE DRAWING

A special embodiment of the process converting plastic waste into power according to the invention, i.e. the most suitable form of implementation, is shown in the form of a flow chart in FIG. 1 and is described in more detail in the following with reference to FIG. 1:

DETAILED DESCRIPTION OF THE INVENTION

The starting products for the process according to the invention for converting plastic waste into power (unpurified and unsorted plastics of any composition) are first size-reduced to a certain fragment size in a shredder stage and, after temporary storage in 1, are fed to a working screw 2 in which the polymer material is further size-reduced, melted and compressed and delivered in the form of one or more strands to a plasma pyrolysis reactor 3 where the plastic waste is subjected in known manner to plasma chemical/pyrolytic/gasifying degradation in an electrically generated plasma in a reducing atmosphere with a substoichiometric oxygen content of the system (hydrogen, steam, CO, etc.) at temperatures above 1500 K. A suitable plasma reactor is described, for example, in East German patent 298 459. The hot plasma pyrolysis gas is then cooled in a quenching stage 4, again in known manner, to stabilize hydrocarbons and, after gas purification, is fed to a combined gas and steam turbine process (GaT process). The gas purification stage adjoins the waste-heat stage 5 for generating steam and the gas cooler 6 of which the function is to cool the plasma pyrolysis gas before it enters the gas purification stage and to reheat it after it has left the gas purification stage. The gas purification stage essentially comprises an acidic absorption stage 7 and a basic absorption stage 8 and is used above all to remove heavy metals in the form of soluble compounds and HCl, HF, HCN and $H_2S$ from the plasma pyrolysis gas. Other components may also be used for the gas purification stage (for example an adsorption stage), depending on the composition of the plasma pyrolysis gases. After leaving the gas purification stage, the plasma pyrolysis gas is compressed to a pressure of >10 bar in the compression stage 9 and is delivered to the heat exchanger 6 for reheating to medium temperatures. The plasma pyrolysis gas is then used to generate power in a gas turbine 10 of which the waste gases may be used to generate steam in another waste heat generator 11. The steam thus generated is then converted into more power in a steam turbine 12. In the present context, "steam turbine" and "gas turbine" are understood to be the coupling of a gas turbine or steam turbine with a generator.

The polymer waste to be recycled is present in various shapes and sizes when removed from the conversion process. In practice, preliminary sorting is necessary where plastic waste is present in the form of composite materials, i.e. relatively large quantities of metals in the recycled product should be avoided to prevent damage to machinery. The plastic waste is first size-reduced in a shredder to such an extent that the individual parts have such a fragment size that the working screw 2 is able to accommodate each individual plastic fragment. In the working screw 2, the plastic fragments are further broken up and size-reduced and partly plasticized (through external heating or the mechanical input of energy) and the plastic waste is introduced into the plasma pyrolysis reactor 3 in the form of a strand having non-plasticizable inclusions. The introduction of steam into the working screw 2 promotes the digestion of the plastic waste. However, the steam may also be introduced into the following plasma pyrolysis reactor 3.

During the plasma pyrolysis process in the plasma pyrolysis reactor 3, where the plastic is completely degraded with high reactivity and at a high reaction rate by a high-temperature (>1500° C.) reducing plasma in the presence of substoichiometric oxygen and converted into hydrocarbons of relatively high value, such as acetylene and ethylene, and also hydrogen and CO (i.e. into a gas of high calorific value), the calorific value of the plastic originally present at low temperature is raised to an exergetic level of higher quality (plasma pyrolysis gas of high calorific value) using electrical energy (current=exergy). High exergetic efficiency levels can be reached during the transfer of the plasma pyrolysis gases to a gas/steam turbine combination (GaT process) in accordance with the invention, so that the amount of electricity generated in the process as a whole exceeds that supplied to the plasma pyrolysis reactor 3 by a considerable amount (for example by a factor of 2 to 2.5), which is the main economic value of the process. On the one hand, plastic waste of any composition can be completely degraded while, on the other hand, the high energy content of the plastic waste is raised to a considerably higher exergetic level—in principle similar to the effect of a heat transformer—through the use of high-quality energy (electricity), so that a large part of this energy content can be recovered in the form of high-quality exergy. After the plasma pyrolysis process, the electrical energy required for the plasma pyrolysis reactor 3, which flows as energy into the plasma pyrolysis gas (in the form of thermal and chemical enthalpy), is also at a high exergetic level (with the plasma pyrolysis gas), so that a considerable proportion thereof can be recovered in the form of pure exergy (current). The guarantee for effective utilization of the high exergy potential thus made available is supplied by the following gas and steam turbine process 9, 10, 11, 12 consisting of the steps of compression 9 of the plasma pyrolysis gas for use in the gas turbine, preheating of the plasma pyrolysis gas in the plasma pyrolysis gas cooler 6, the gas turbine 10, the waste heat boiler 11 and the steam turbine 12. The coupling between a plasma pyrolysis process and a GaT process proposed in accordance with the invention represents an almost ideal process for solving the problem addressed by the present invention:

Plastic waste is converted safely and completely into power and, hence, high-quality energy is produced with high exergetic efficiency (approx. 50%, based on the calorific value of the plastic waste+current for the plasma pyrolysis reactor 3) from an unwanted, potentially dangerous product normally intended for disposal as waste. Between the plasma pyrolysis reactor 3 and the compression stage 9 for the GaT process are the stages of plasma pyrolysis gas quenching 4, the waste heat boiler 5, the plasma pyrolysis gas cooler 6 and the gas purification stages 7 and 8. In the plasma pyrolysis gas quenching stage 4, the hydrocarbons $C_2H_2$ and $C_2H_4$ from the plasma pyrolysis reactor are stabilized, for example, by spraying in cold recycle gas and the plasma pyrolysis gas is cooled in the following waste heat boiler 5 and used to generate steam. The function of the pyrolysis gas cooler 6 is to cool the plasma pyrolysis gas for the following gas purification stage to temperatures below 100° C. and, at the same time, to reheat the plasma pyrolysis gas to almost the exit temperature of the waste heat boiler (at least 200° C.). The gas purification stages 7 and 8 are used to remove $H_2S$, $HCl$, $HCN$ and $HF$ by the absorption and heavy metals by adsorption.

The gas purification stage is a known stage which is not relevant to the invention and, accordingly, may assume various forms (see, for example, Fritz/Kern, "Reinigung von Abgasen (Purification of Waste Gases)", Vogel-Verlag, Würzburg, 2nd Edition, 1990). Gas flow in the reactor is established on the one hand by the addition of the plasma gas under pressure into the plasma pyrolysis reactor 3 and, on the other hand, through the operation of the compression stage 9.

It is best to install an MHD generator after the plasma pyrolysis reactor 3 to enable the power yield to be further increased by better utilization of the exergetic potential of the plasma pyrolysis gas.

In addition, the process according to the invention leaves open the possibility of directly utilizing part of the plasma pyrolysis gas by partial removal thereof before or after the compression stage 9. This possibility derives from economic considerations.

EXAMPLE

The process according to the invention is illustrated by the following Example:

A mixture of plastic waste consisting of 50% polyethylene/polypropylene, 20% polyurethane, 10% polycarbonates, 10% PVC and 10% polyacrylonitrile/polystyrene is size-reduced in a shredding unit to a fragment size of 0.1 m×0.1 m×0.1 m (cubic) suitable for the following feed screw 2 and (after intermediate storage 1) is introduced into the feed screw 2, plasticized therein in the presence of steam and introduced in the form of a paste into the plasma pyrolysis reactor 3. By means of a hydrogen plasma with a mean mass temperature of 3000° C., the polymer mixture (calorific value approx. 40,000 kJ/kg) is converted completely—in regard to its organic constituents—into a plasma pyrolysis gas of high calorific value with the following composition and hence raised to a high exergetic level:

| | |
|---|---|
| Acetylene | 30.6 Ma-% |
| Ethylene | 25.6 Ma-% |
| $H_2$ | 6.2 Ma-% |
| CO | 21.0 Ma-% |
| Methane | 5.5 Ma-% |
| HCl, $H_2S$, $N_2$ | 10.0 Ma-% |
| HCN | 0.5 Ma-% |

(Ma-% = mol-%)

The calorific value of the plasma pyrolysis gas is approximately 37,000 $kJ/m^3$ the temperature at the reactor exit is approximately 2500° C. To stabilize the hydrocarbons, the plasma pyrolysis gas is quenched with cold plasma pyrolysis gas to a temperature of 1000° C. in the quenching unit 4 and is used to generate steam in the following waste heat boiler 5. The steam obtained may then be used in a steam turbine 13. In the pyrolysis gas cooler 6, the plasma pyrolysis gas is cooled from the exit temperature of the waste heat boiler 5 to a temperature of <100° C. in countercurrent with cold plasma pyrolysis gas and—in a coupled acidic and basic absorption stage 7—is freed from HCl (acidic stage) and from $H_2S$, HCN and residual traces of HCl (basic absorption stage). In the following adsorption stage 8, heavy metals are removed from the plasma pyrolysis gas. The hydrochloric acid from the acidic washing stage 7 is fed to an electrolysis process. After compression of the purified plasma pyrolysis gas to a pressure of 24 bar (compressor 9), the plasma pyrolysis gas is returned to the pyrolysis gas cooler 6 and heated therein. The purified hot plasma pyrolysis gas is then delivered to a gas turbine 10 and converted into electricity with high exergetic efficiency. The hot waste gases from the gas turbine are fed to another waste heat boiler 11 where they are used to generate steam. The steam generated is expanded in a counter pressure turbine 12 and, using the heat/power combination, is converted into low-pressure steam for heating purposes.

The exergetic balance of the preceding Example shows that the calorific value of the plastic is raised in the plasma pyrolysis reactor 3 to such a high exergetic level that approximately 40% thereof can be converted into power and is available as exergy. This value is formed with elimination of expenditure on electricity for the plasma pyrolysis reactor. The electricity used for the plasma pyrolysis reactor also reappears in the thermal and chemical enthalpy of the plasma pyrolysis gas which always has a high exergetic level so that this energy component can also be recovered as electricity with a high degree of efficiency.

An efficient possibility for increasing the power yield is to connect an MHD generator after the plasma pyrolysis reactor 3.

We claim:

1. A process for converting plastic waste into power, comprising the steps of: reacting plastic waste in a plasma reactor under reducing conditions in a plasma containing substoichiometric oxygen at temperatures above 1200° C. to form a plasma pyrolysis gas consisting of low molecular weight carbon fragments; cooling the plastic pyrolized gas to temperatures below 1500° C.; compressing the plasma pyrolysis gas to a pressure above 10 bar; delivering the compressed pyrolysis gas as a fuel of high calorific value and high temperature to a gas turbine for generating electric power; passing waste gases from the gas turbine into a boiler to generate steam; and feeding the steam into a steam turbine for generating more electric power.

2. A process as claimed in claim 1, further comprising freeing the plasma pyrolysis gas from heavy metals and acidic constituents before delivery to the gas turbine and wherein the gas is reheated to substantially its original temperature after compression.

3. A process as claimed in claim 1, for direct power generation, wherein the plasma pyrolysis gas is passed through a magneto hydrodynamic generator and then delivered to the gas turbine.

4. A process as claimed in claim 1, wherein the plastic waste is melted and continuously introduced into the plasma reactor in liquid or paste-like form.

5. A process as claimed in claim 1, wherein the hydrocarbons in the plasma pyrolysis gas are partly removed before the step of delivering.

* * * * *